Figure 1:
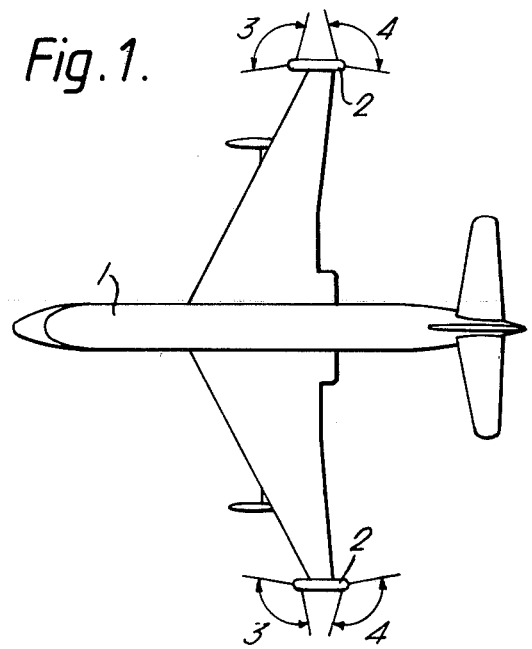

United States Patent [19]

Anderson et al.

[11] 4,328,499
[45] May 4, 1982

[54] RADIO DIRECTION FINDING SYSTEMS

[75] Inventors: Donald W. Anderson, Watford; Leonard J. Ogier, St. Albans, both of England

[73] Assignee: The Marconi Company Limited, Chelmsford, England

[21] Appl. No.: 89,172

[22] Filed: Oct. 24, 1979

[51] Int. Cl.³ ............................................. G01S 5/02
[52] U.S. Cl. ................................................ 343/113 R
[58] Field of Search ........ 343/113 R, 100 SA, 105 R, 343/854, 115, 117 A, 120

[56] References Cited

U.S. PATENT DOCUMENTS 3,121,871 2/1964 Beukers ........................... 343/113 R
3,245,079 4/1966 Stover ............................. 343/113 R
3,815,135 6/1974 Martin et al. ................... 343/113 R Primary Examiner—Theodore M. Blum
Attorney, Agent, or Firm—Kirschstein, Kirschstein, Ottinger & Cobrin

[57] ABSTRACT

A radio direction finding system in which the angle of arrival of radio signals incident on a group of antenna elements is determined from the relative phase or phases of the radio signals incident upon two or more of said antenna elements. One of said elements is connected to a first radio receiver, while the other elements of the group are connected in turn to a second radio receiver, successive values of relative phase between signals received by the two receivers being utlized to derive a value for the angle of arrival of a radio signal relative to the antenna elements.

5 Claims, 5 Drawing Figures

RADIO DIRECTION FINDING SYSTEMS

The present invention relates to radio direction finding systems.

In particular the invention is concerned with direction finding systems in which a value for the direction of arrival of radio signals incident upon two or more spaced antenna elements is derived from the relative phases of said radio signals at the two or more antenna elements.

According to one aspect of the present invention in a radio direction finding system of the kind in which the angle of arrival of radio signals incident upon two or more spaced antenna elements of the system is determined at least in part from the relative phase or phases of the radio signals incident upon said two or more antenna elements, there are provided at least three antenna elements, one of which is connected to a first radio receiver while the remainder are connected in turn to a second radio receiver, successive values of the relative phase between signals received by said two receivers being utilised to derive a value for the direction of arrival of said radio signal relative to said antenna elements.

According to another aspect of the present invention in a radio direction finding system of the kind in which radio signals incident upon spaced antenna elements are compared in phase and the value of phase of difference is utilised to determine the angle of arrival of said radio signals with respect to said antenna elements, there are provided two radio receiver arrangements and three or more spaced antenna elements, one of said receiver arrangements being arranged to receive radio signals from one only of said three or more antenna elements and the other of said receiver arrangements being arranged to receive radio signals selectively from any one of the remaining antenna elements, and the angle of arrival of said radio signals is arranged to be determined from the respective phase differences between radio signals received by one antenna element and by said other antenna elements respectively.

Preferably the signals representing said phase differences are digitally encoded and stored at least temporarily in digital storage means, and said remaining antenna elements are connected in turn to said other receiving arrangement to provide a succession of such phase difference signals, from which an unambiguous value for the angle of arrival of said radio signals may be derived.

Figure 2:
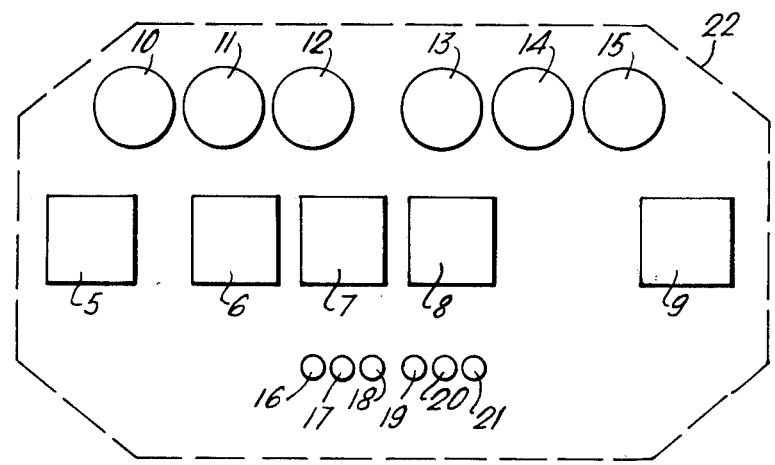
Figure 3:
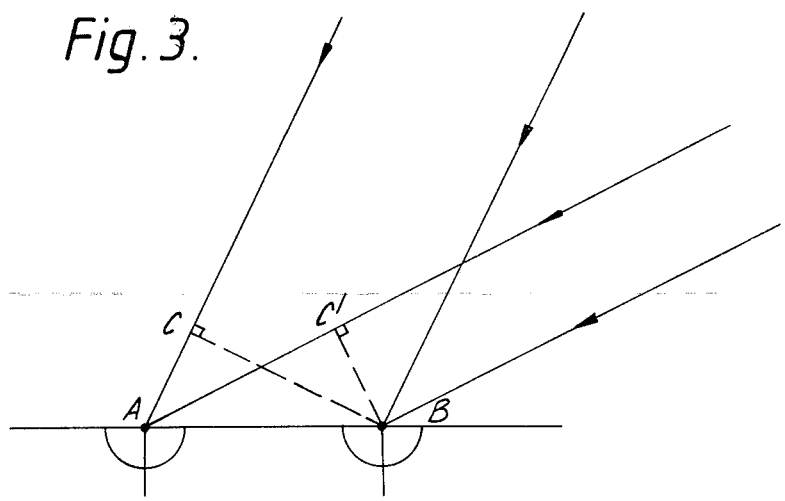
Figure 4:
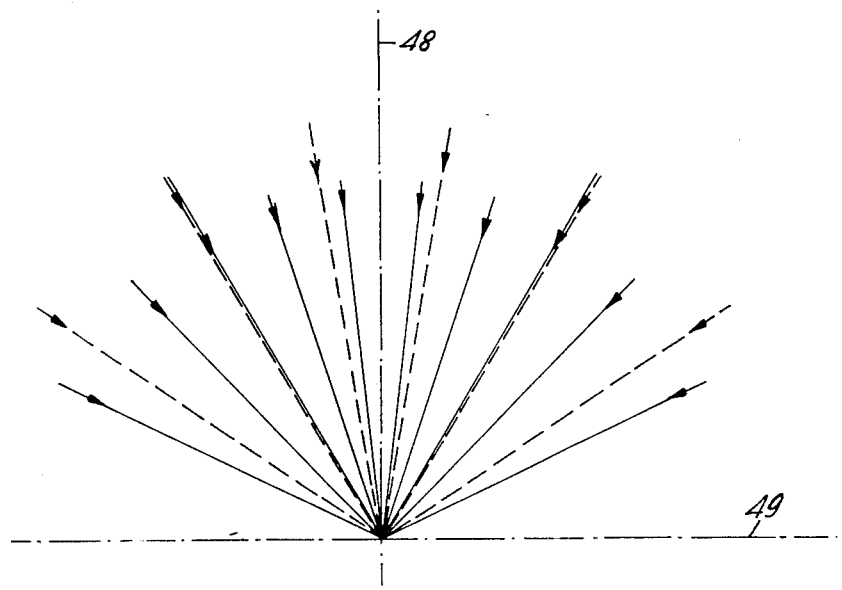
Figure 5:
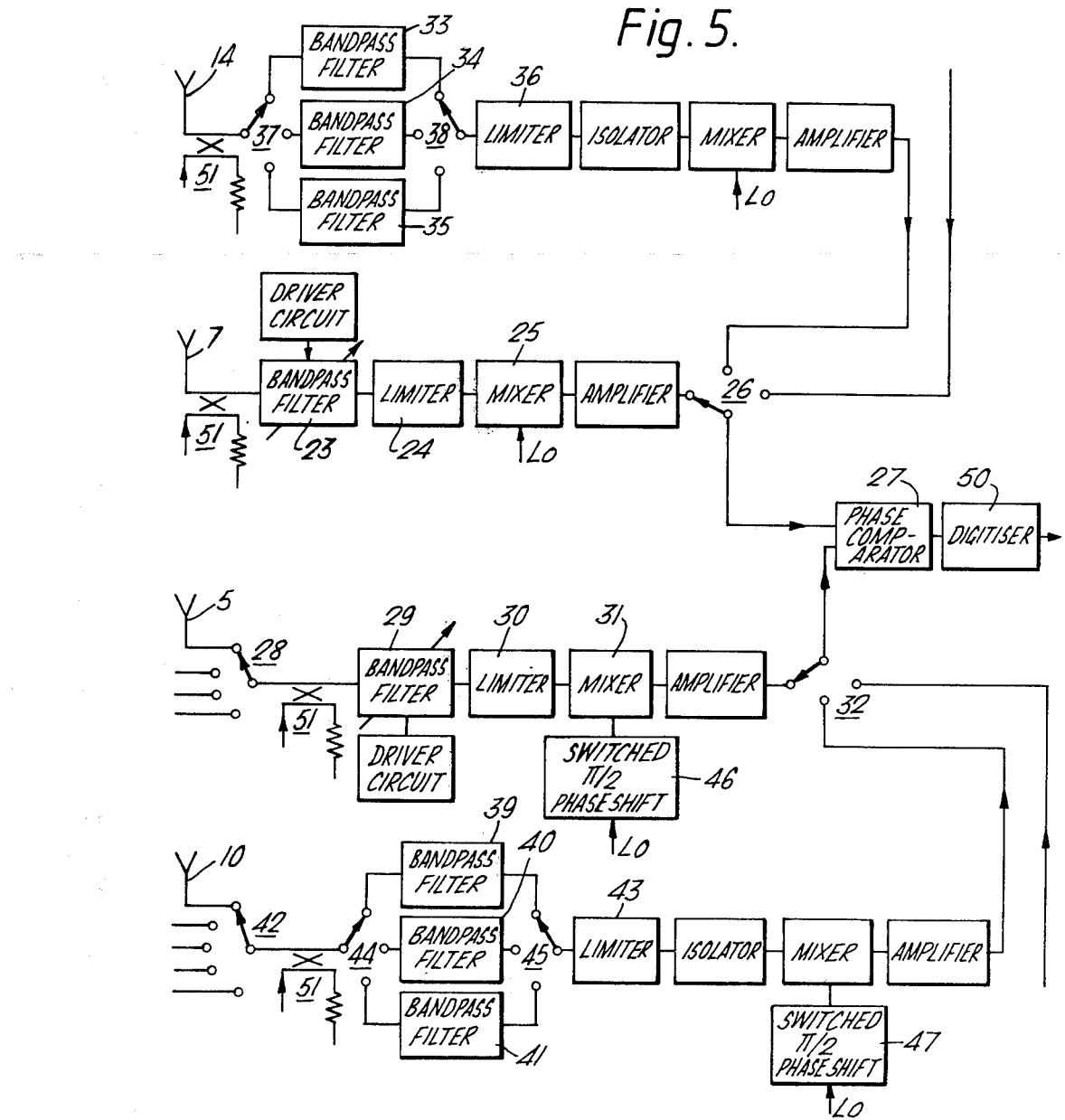

A radio direction finding system in accordance with the present invention will now be described with reference to the accompanying drawings, of which:

FIG. 1 shows diagrammatically the general disposition of parts of the system in an aircraft, FIG. 2 shows diagrammatically an array of antenna elements used in the system, FIGS. 3 and 4 illustrate the incidence of radio signals on antenna elements of the array, and FIG. 5 shows schematically a receiver arrangement of the system.

Referring first to FIG. 1 the direction finding system is an airborne system, and is required to respond to incident radio signals having frequencies within a frequency range extending from say, 0.5 to 18 GHz, from any direction in azimuth and from a predetermined range of angles of elevation. In the aircraft 1 shown in FIG. 1 four antenna arrays and their respective receiving units are disposed in pairs in wing-tip pods 2 where they are arranged to receive radio signals from respective fore and aft sectors 3 and 4 somewhat over ninety degrees wide, each array and respective receiving unit being required to handle any received radio signals or "activity" within the above frequency range from its respective quadrant.

As shown diagrammatically in FIG. 2 each antenna array comprises a row of five antennae 5 to 9 which are each optimised for frequencies over the range from 0.5 GHz to 2.0 GHz, six antennae 10 to 15 for the frequency range from 2.0 GHz to 6.0 GHz and six antennae 16 to 21 for the frequency range 6.0 GHz to 18 GHz. The ground plane 22 in which these antennae lie is at an angle of some forty-five degrees to the fore and aft axis of the pod 2.

The antennae 7, 14 and 20 are connected to respective "reference" receivers (not shown in FIG. 2) while the remaining antennae in each row are arranged to be connected selectively in turn to a respective "phase" receiver (not shown in FIG. 2). The positions of the reference antennae 7, 14 and 20 in their respective rows and with respect to the ground plane 22 are chosen to give as nearly as possible symmetrical radiation patterns for these particular antennae. The antennae may be cavity-backed spiral antennae.

Referring now to FIG. 5, which shows schematically the reference and phase receiver arrangements of one quadrant for the 0.5 GHz to 2.0 GHz and 2.0 GHz to 6.0 GHz bands, the antenna 7 is connected to the respective reference receiver arrangement which comprises a tunable bandpass filter 23, an amplitude limiter 24 and a mixer 25. Intermediate frequency or I.F. signals of frequencies between, say, 43 MHz and 77 MHz from the mixer 25 are amplified and applied by way of a band select switch 26 to one input of a phase comparator 27. The antennae 5, 6, 8 and 9 are connected selectively to the phase receiver arrangement by way of a selector switch 28, the phase receiver comprising a tunable bandpass filter 29, an amplitude limiter 30 and a mixer 31. I.F. signals from the mixer 31 are amplified and applied by way of a band select switch 32 to another input of the phase comparator 27, the two switches 26 and 32 being operable in step with one another.

The reference receiver arrangements for the two higher frequency bands are similar to that described above, except that the tunable filter 23 is replaced by three fixed bandpass filters 33, 34 and 35, these filters being connected between the antenna 14 and a limiter 36, in the case of the band from 2 GHz to 6 GHz, by way of switches 37 and 38. Similarly in the higher frequency phase receivers the tunable filter 29 is replaced by bandpass filters 39, 40 and 41, which in the case of the band from 2 GHz to 6 GHz are connected between an antenna selector switch 42 and a limiter 43 by way of switches 44 and 45.

The local oscillator signals for the mixers 25 and 31, and those in the higher frequency band receivers, are derived from a frequency synthesizer (not shown), phase shifter arrangements 46 and 47 being provided in the local oscillator signal paths to the phase receivers to enable the local oscillator signals selectively to be shifted in phase by ninety degrees.

Referring now to FIG. 3, where two antennae, referenced A and B, are receiving signals from distant sources (not shown) the path lengths for those signals from the sources to the two antennae differ by the distances AC and AC' respectively. For received signals of any given wavelength these path differences will give rise to phase differences between signals arriving at the antennae A and B. Where the distance between these antennae is greater than the wavelength of the received signal there will clearly be more than one possible path difference which will give rise to a particular phase difference. Equally there will be particular received signal frequencies at which the path differences AC and AC' of FIG. 3 will differ from one another by exactly one wavelength, or by exact multiples of a wavelength, so that signals arriving from the two directions indicated will give rise to the same phase difference at the antennae A and B.

In FIG. 4 there are shown, by way of example, the directions from which a signal with a wavelength of one fifth of the spacing of the antennae A and B can arrive in antiphase at the two antennae (solid lines), a total of ten directions symmetrically disposed about the normal 48 to the ground plane 49 in which the antennae A and B lie. Also shown are the directions (dashed lines) from which a signal of the same wavelength incident on two antennae at three fifths of the spacing of antennae A and B would give rise to a similar phase difference. As can be seen there are only two directions of arrival, thirty degrees either side of the normal 48, from which a signal could give rise to the above phase differences at the two antennae pairs. Thus although the measured phase difference at each of these antenna pairs may give rise to some ambiguity in the angle of arrival of the signal, the combination of information from the two antenna pairs of different spacings can largely resolve this ambiguity.

An antenna pair having a spacing less than the wavelength of the incident signals will give a unique value for the angle of arrival to an accuracy limited by the resolution of the phase comparator 27. With the wider antenna spacings described above the same degree of resolution in the phase comparator 27 will give greater accuracy due to the smaller range of angles of arrival for a given range of phase difference. In general several antenna pairs with different spacings will be used so as to combine unambiguous values for the angle of arrival with acceptable accuracy.

Referring again to FIG. 5, the system is normally arranged to analyse an incoming signal which has already been detected by a search receiver (not shown), or to update readings previously obtained, the switches 26 and 32 being set so as to connect the required reference and phase receiver arrangements to the phase comparator 27, and the local oscillator being arranged to generate the required frequency, in dependence upon stored information concerning the relevant incoming signal. If the incoming signal is in the 0.5 GHz to 2.0 GHz band the switches 26 and 32 will be in the state shown in the drawing. The switch 28 is arranged to be stepped so as to connect the antennae 5, 6, 8 and 9, not necessarily in that order, in turn to the input of the tunable filter 29. The four values of phase difference obtained in respect of the four antenna pairings are converted to digital format in a digitiser 50, and these digitised values and the frequency of the incoming signal are passed to a processor unit (not shown) which determines the angle of arrival of the incoming signal.

The phase shifter arrangement 46 may be utilised, as described in copending patent application No. 18108/77, to distinguish between intermediate signals in the two sidebands so as to determine whether the incoming signal is above or below the local oscillator signal in frequency.

The system may also be used to search any particular frequency range for activity by applying to the appropriate mixers a series of local oscillator signals of different frequencies, such that the frequency range is covered as a series of "windows". Any activity in any one or more adjacent windows would, on detection or subsequently when convenient, be analysed to determine its direction of arrival and any characterising signal variations. For example the frequency band from 0.5 GHz to 2.0 GHz could be covered by a series of 150 windows each 10 MHz wide, as defined by filters in the receiver channel, with a dwell time in respect of each window of 5 milliseconds, in a search time of 750 milliseconds.

If necessary particular restricted frequency ranges may be assigned a degree of priority, such that they are searched at more frequent intervals than other frequency ranges.

Test signals may be generated by the frequency synthesizer (not shown) and applied to the respective receiver inputs by way of couplers 51.

The path lengths from the antennae 5, 6, 8 and 9 through the switch 28 to the output of that switch should all be equal, since any inequalities will directly affect the accuracy of the phase measurement.

The reference receiver may be a relatively high quality receiver substantially free from spurious responses, by means of which the various characteristics of received signals may be accurately established, while the phase received may be of simpler design since it is only involved in the phase measurement. The use of only two receivers simplifies the phase tracking to that of the antenna to switch paths, while the performance of the system as a whole can be varied by adding or removing antennae and altering the antenna switch accordingly.

We claim:

1. A radio direction finding system of the kind in which radio signals incident upon spaced antenna elements from a predetermined sector are compared in phase and the value of phase difference is utilised to determine the angle of arrival of said radio signals with respect to said antenna elements, wherein there are provided two radio receiver arrangements and at least three spaced antenna elements aligned substantially in a common plane to receive radio signals from said sector, means to connect one of said receiver arrangements to receive radio signals from one only of said antenna elements and means to connect the other of said receiver arrangements to receive radio signals selectively from any one of the remaining antenna elements, and the angle of arrival of said radio signals is arranged to be determined from the respective phase differences between radio signals received by said one antenna element and by said other antenna elements respectively.

2. A radio direction finding system in accordance with claim 1 in which signals representing said phase differences are digitally encoded and stored in digital storage means.

3. A radio direction finding system in accordance with claim 2 wherein said remaining antenna elements are connected in turn to said other receiving arrangement to provide a succession of phase difference signals from which a value for the angle of arrival of said radio signals may be derived.

4. A radio direction finding system in accordance with claim 1, claim 2 or claim 3 wherein there are provided at least five antenna elements.

5. A radio direction finding system in accordance with claim 1 wherein local oscillator signals for said radio receiver arrangements are generated by a frequency synthesizer.

* * * * *